UNITED STATES PATENT OFFICE.

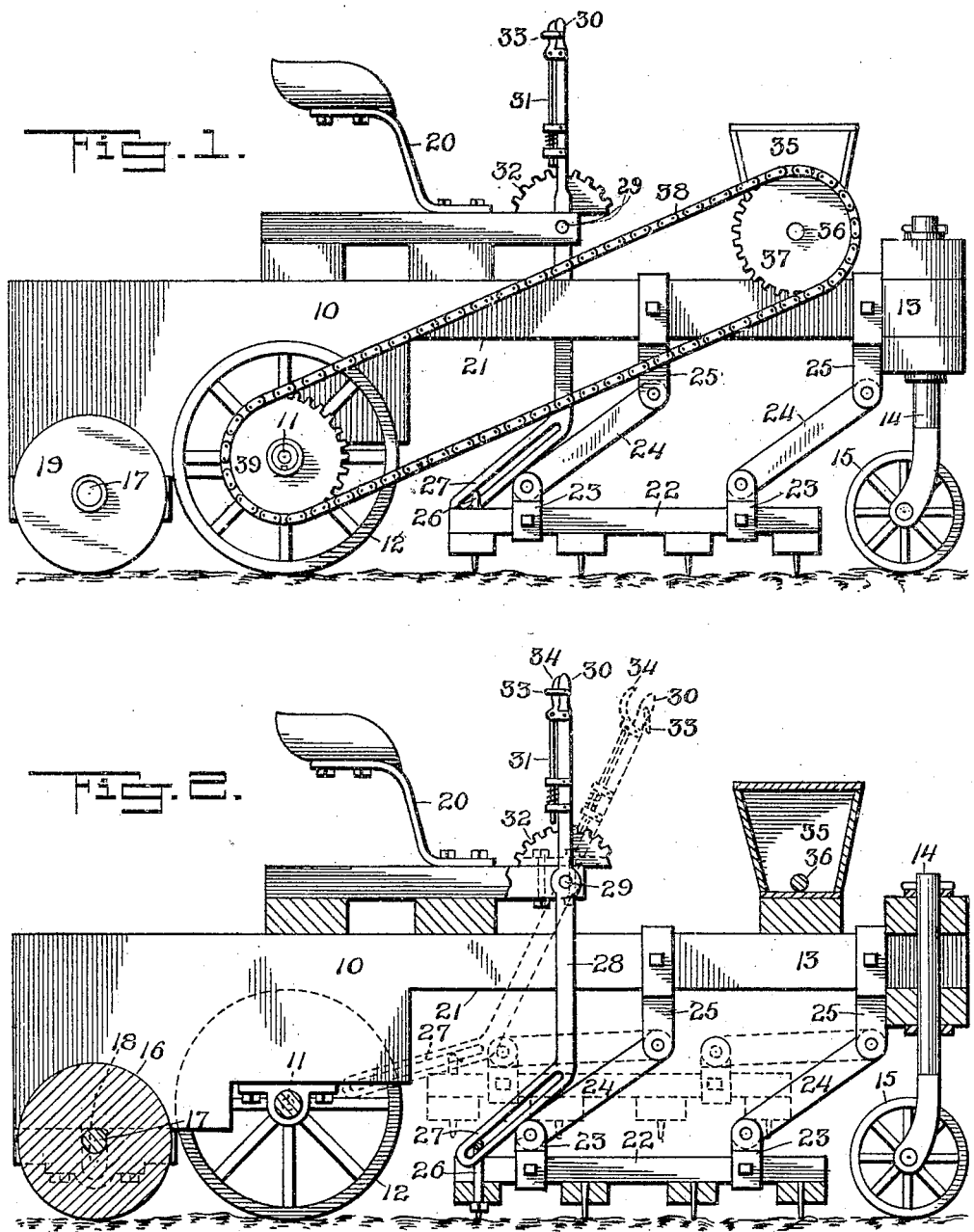

JOHN L. BUCKINGHAM, OF LATON, CALIFORNIA.

COMBINATION-HARROW.

962,742. Specification of Letters Patent. Patented June 28, 1910.

Application filed October 4, 1909. Serial No. 520,775.

*To all whom it may concern:*

Be it known that I, JOHN L. BUCKINGHAM, a citizen of the United States, residing at Laton, county of Fresno, State of California, have invented certain new and useful Improvements in Combination-Harrows, of which the following is a specification, reference being had therein to the accompanying drawing.

This invention relates to a combination harrow and particularly to a structure adapted to embody in a single implement a truck having a harrow, land roller and seed sower combined for separate or simultaneous operation.

The invention has for an object to provide a novel construction of harrow and raising lever therefor whereby the harrow may be held for any desired depth of travel; or allowed to float; or raised out of operative position in order to dump any material collected by the teeth thereof and permit the use of the implement without the harrow.

Other and further objects and advantages of the invention will be hereinafter set forth and the novel features thereof defined by the appended claims.

In the drawing—Figure 1 is a side elevation of the invention; and Fig. 2 is a vertical longitudinal section thereof with parts in elevation.

Like numerals of reference refer to like parts in the several figures of the drawing.

The numeral 10 designates the truck of the implement which may be of any desired construction or configuration. It is provided with a shaft 11 having secured at its opposite ends traction wheels 12. The front of the truck is provided with a centrally disposed bearing 13 to receive the vertical shaft 14 of the front wheel 15. This shaft 14 is free to rotate in its bearing in order to adjust it to the direction of travel thus comprising a three wheel truck which may be used for any purpose.

At the rear of the traction wheels 12 a land roller 16 is mounted loosely upon a shaft 17 disposed in a vertical slot 18 of the truck so as to permit the constant contact of the roller with the ground by gravity. Upon the ends of the shaft 17 which extend beyond the sides of the truck, extension rollers 19 are loosely mounted as shown in Fig. 1. This loose mounting permits free rotation of the rollers upon the shaft and prevents binding when turning the truck. The truck is also provided with a seat 20 and any desired connection for draft purposes.

The under face of the truck is recessed at its front portion as shown at 21 and beneath this portion a harrow 22 of any desired construction is disposed. This harrow is provided with pivoting clips 23 extended upward therefrom and connected to the parallel inclined links 24 by which the harrow is suspended. These links are pivoted at their upper ends to the depending clips 25. The harrow is also provided at its rear with a bail 26 extending upward therefrom and passing through the slotted angularly disposed end 27 of the controlling lever 28 which is pivoted upon the truck frame at 29. The handle end 30 of this lever is formed with the usual spring pressed latch rod 31 adapted to coöperate with the fixed sector 32 in the usual manner. For the purpose of retaining the latch out of engagement with the sector when it is desired to allow a floating movement of the harrow, the holding bail 33 is pivotally mounted on the handle 30 to swing into engagement with the hand piece 34 of the latch rod as shown by full lines in Fig. 2.

When it is desired to use a seed sower with the implement it may be located at the front thereof as indicated at 35 and its shaft 36 provided with a driving sprocket 37 which is connected with the shaft of the traction wheels by means of the chain 38 passing over a sprocket 39 secured to said shaft.

In the operation of the invention with the parts in the position shown by full lines in Fig. 2 the lever is unlatched and the harrow free to float or rise. If this lever be latched, the harrow may be held at any desired depth and against any vertical movement upon its links. When the latch be released and the lever thrown into the position shown by dotted lines the harrow will be raised to dump therefrom any weeds or other material collected thereon. The harrow may be secured in this raised position for transportation by latching the lever. The arrangement of the parallel supporting links and slotted angular end of the lever permit control of the harrow in any desired position as it rises in an arc different from that of the lever end. The slotted mounting for the land roller and its loose mounting upon its shaft permit a free rising and falling thereof and also prevent friction in turning the truck. This roller and also the harrow may be readily detached and the three wheel truck used for any other desired purpose. The roller is also extended beyond the sides of the truck so as to fully cover the area operated upon by the harrow and is held in contact with the ground by the weight of the truck and when the wheels of the truck pass over a raised portion of the ground, they are relieved of the weight of the roller through the slotted connection of the truck. When it is not desired to use the seed sower, the driving chain therefor may be removed from its sprockets so that the invention comprises a simple, efficient and economically constructed implement adapted to carry a plurality of different tools which can be operated therefrom independent of each other or jointly if so desired.

Having described my invention and set forth its merits what I claim and desire to secure by Letters Patent is—

1. In a combination harrow, a truck, a harrow frame, parallel supporting links pivoted upon said truck and frame, and an operating lever mounted upon said truck and having a slotted lower end extended substantially parallel to said links and slidingly connected to said frame.

2. In a combination harrow, a truck, a harrow frame, parallel supporting links pivoted upon said truck and frame, an operating lever mounted upon said truck and having a slotted lower end extended substantially parallel to said links and slidingly connected to said frame, a sector and latch for retaining said lever, and means for holding said latch out of engagement with said sector.

3. In a combination harrow, a truck, a harrow frame, parallel supporting links pivoted upon said truck and frame, an operating lever mounted upon said truck and having a slotted lower end extended substantially parallel to said links and slidingly connected to said frame, a sector and latch for retaining said lever, and a bail pivoted on said lever to embrace a member of said latch for holding the latch out of engagement with said sector.

4. In a combination harrow, a truck, a harrow frame, parallel supporting links pivoted upon said truck and frame, a lever mounted upon said truck and having an angularly disposed slotted lower end substantially parallel with said links, and a bail upon said frame extended through said slot.

5. In a combination harrow, a truck having a recess beneath its front portion, depending pivoting members from said portion, rearwardly inclined parallel links pivoted to said members, a harrow frame pivoted to the lower end of said links, and an operating lever mounted upon said truck and having a rearwardly inclined slotted portion at its lower end substantially parallel with said links and slidingly connected to the rear of the harrow frame.

6. In a combination harrow, a truck having a recess beneath its front portion, depending pivoting members from said portion, rearwardly inclined parallel links pivoted to said members, a harrow frame pivoted to the lower end of said links, an operating lever mounted upon said truck and having a rearwardly inclined slotted portion at its lower end substantially parallel with said links and slidingly connected to the rear of the harrow frame, a latch bolt carried by said lever, a coöperating toothed sector, and means carried by said lever for holding said bolt in released position.

In testimony whereof I affix my signature in presence of two witnesses.

JOHN L. BUCKINGHAM.

Witnesses:
C. O. MITCHELL,
N. P. GOUSER.